United States Patent [19]
Golden et al.

[11] Patent Number: 6,027,549
[45] Date of Patent: Feb. 22, 2000

[54] ADJUSTED DENSITY CARBON FOR HYDROGEN PSA

[75] Inventors: Timothy Christopher Golden, Allentown; Thomas Stephen Farris, Bethlehem; Wilbur Clymer Kratz, Macungie; William Emil Waldron, North Catasauqua; Charles Henry Johnson, Coplay, all of Pa.

[73] Assignee: Air Products and Chemicals, Inc., Allentown, Pa.

[21] Appl. No.: 09/067,742

[22] Filed: Apr. 28, 1998

[51] Int. Cl.⁷ .................................................. B01D 53/047
[52] U.S. Cl. .................. 95/98; 95/105; 95/139; 95/143; 95/901
[58] Field of Search ................ 95/96–98, 100–105, 95/139, 143, 901

[56] References Cited

U.S. PATENT DOCUMENTS

| | | | |
|---|---|---|---|
| 3,176,444 | 4/1965 | Kiyonaga | 55/26 |
| 3,252,268 | 5/1966 | Stark | 55/25 |
| 3,323,288 | 6/1967 | Cheung et al. | 55/58 |
| 3,430,418 | 3/1969 | Wagner | 55/25 |
| 3,986,849 | 10/1976 | Fuderer et al. | 95/139 X |
| 4,077,779 | 3/1978 | Sircar et al. | 95/139 X |
| 4,077,780 | 3/1978 | Doshi | 55/26 |
| 4,627,857 | 12/1986 | Sutt, Jr. | 95/139 X |
| 4,629,476 | 12/1986 | Sutt, Jr. | 95/139 X |
| 4,696,680 | 9/1987 | Ghate et al. | 95/139 X |
| 4,726,815 | 2/1988 | Hashimoto et al. | 95/139 X |
| 4,790,859 | 12/1988 | Marumo et al. | 95/139 X |
| 4,810,266 | 3/1989 | Zinnen et al. | 95/139 |
| 4,853,004 | 8/1989 | Kaplan et al. | 55/25 |
| 4,964,888 | 10/1990 | Miller | 95/139 X |
| 5,118,329 | 6/1992 | Kosaka et al. | 95/143 |
| 5,276,000 | 1/1994 | Matthews et al. | 95/143 X |
| 5,304,527 | 4/1994 | Dimitri | 95/143 X |
| 5,421,860 | 6/1995 | Bretz et al. | 95/143 X |
| 5,542,966 | 8/1996 | D'Amico et al. | 95/143 X |
| 5,639,707 | 6/1997 | Lewis et al. | 95/143 X |
| 5,707,425 | 1/1998 | D'Amico et al. | 95/143 X |
| 5,710,092 | 1/1998 | Baker | 95/901 X |

*Primary Examiner*—Robert H. Spitzer
*Attorney, Agent, or Firm*—Geoffrey L. Chase

[57] ABSTRACT

The present invention is a process for adsorbing carbon dioxide from a carbon dioxide containing gas mixture comprising contacting the gas mixture with an activated carbon adsorbent having a density in the range of approximately 0.56 to 0.61 g/cc (35 to 38 lbs./ft³) and adsorbing the carbon dioxide on the activated carbon adsorbent.

6 Claims, 3 Drawing Sheets

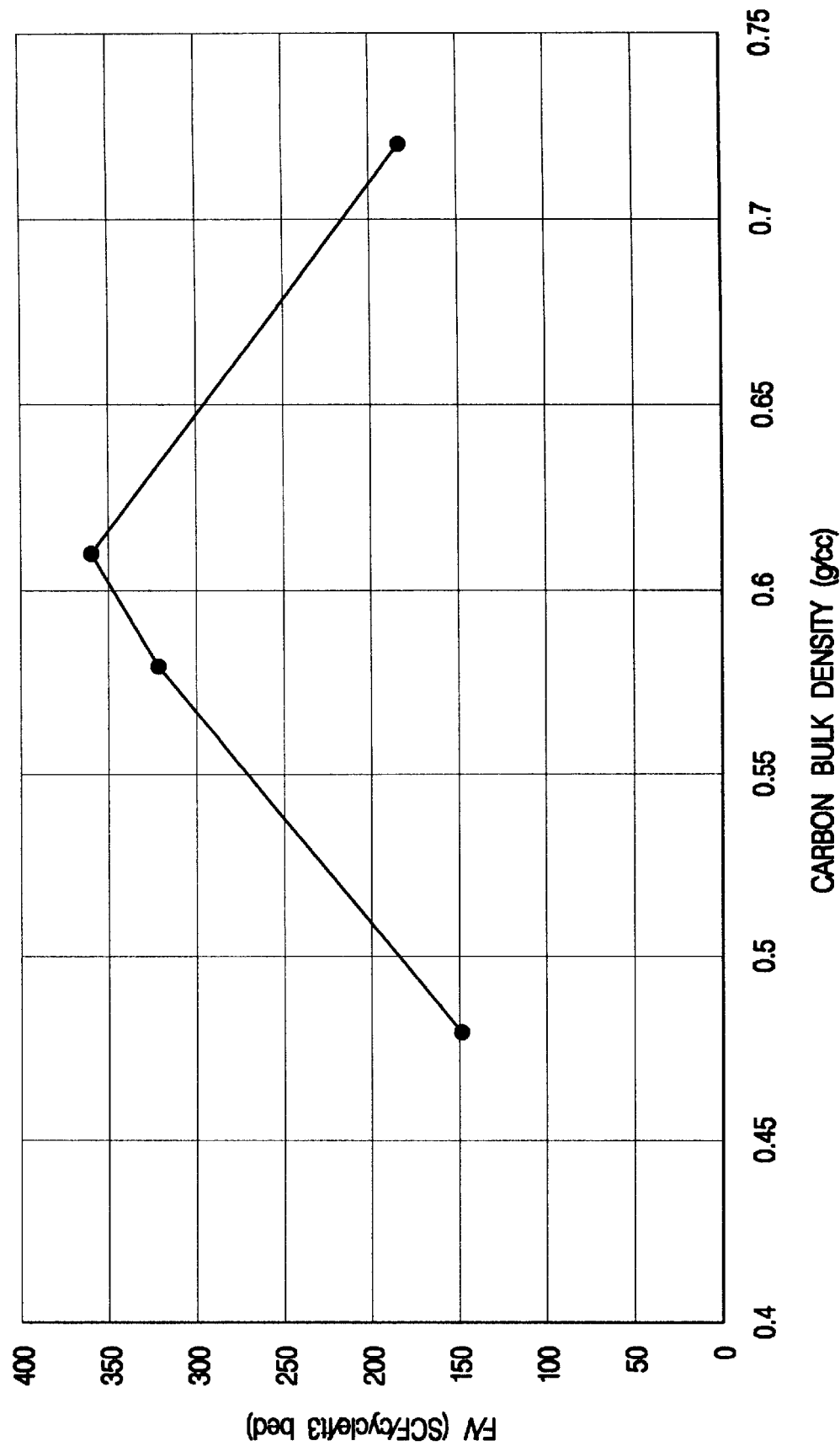

ADJUSTED DENSITY CARBON FOR HYDROGEN PSA

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Carbon dioxide and other carbon oxides are frequently found in gas mixtures in industrial processes that contain other more industrially valuable gases, such as hydrogen or helium.

A major industrial process that is faced with gas mixtures containing more valuable hydrogen with less valuable carbon oxides is the steam-methane reforming industry and other forms of hydrocarbon reformations.

These industrial processes typically generate hydrogen rich synthesis gas containing less desirable carbon dioxide and carbon monoxide, as well as methane. This synthesis gas or reformate is purified by treatment in a pressure swing adsorptive separation to recover unadsorbed hydrogen and retain adsorbed carbon oxides. Examples of the prior art attempts to purify such gases are set forth below.

U.S. Pat. No. 3,176,444 relates to an improved process for purifying a fluid stream and also improving the recovery of the purified fluid. Process cycle steps including co-current depressurization, repressurization by feed and vacuum regeneration are all depicted. Purification of hydrogen from a variety of feed streams is taught in a number of examples. The '444 patent is of particular interest because it provides a list of suitable adsorbents for use in this process, including zeolite molecular sieves, activated carbon, silica gel and activated alumina. The patent clearly states that if the removal of carbon dioxide is desired, the correct choice of adsorbent is activated carbon because carbon dioxide is a strong adsorbate and carbon is a weak adsorbent. However, the important properties of the activated carbon which would improve hydrogen recovery and productivity are not addressed.

U.S. Pat. No. 3,252,268 teaches a specific combination of adsorption zones or beds operated in a specific manner to produce both a high purity product (preferably hydrogen) and a moderately pure product with improved product recovery. In processing tail gas from a hydroforming reaction, containing $C_1$–$C_4$ hydrocarbons, hydrogen recovery ranging from 70–85% was achieved. The preferred adsorbent for the main beds is charcoal. A table in the patent presents operating, preferred and especially preferred charcoal characteristics as follows: 20–200 Å pore diameter, 20–60 Å pore diameter and 20–40 Å pore diameter, respectively. The carbon used in the preferred unit was Columbia Grade ACC, 6×14 mesh (1,100 $m^2/g$). The bulk density of the material determined from the weight of carbon in the unit and the volume it contained (2,460 lbs/98 $ft^3$) was 0.40 g/cc (25.1 lbs/$ft^3$).

U.S. Pat. No. 3,323,288 details an improved pressure swing adsorption system in which detrimental heat effects are avoided by using adsorbent beds which are thermally integrated in the form of a packed bed heat exchanger. The separation of bulk $CO_2$ from $H_2$ is taught in one example in which 6×8 mesh activated carbon is used as the adsorbent. The bulk density of the adsorbent is 0.48 g/cc (30 lbs/$ft^3$).

Another key patent in the area of hydrogen PSA process technology is U.S. Pat. No. 3,430,418. This invention relates to a process for separating gas mixtures including CO, $CO_2$, $CH_4$, $N_2$, and $H_2O$ from $H_2$. In Example 1 of the patent, adsorbent columns layered with activated carbon and calcium A zeolite were used to produce a high purity hydrogen product (99.9999%). The process steps consisted of adsorption, pressure equalization, co-current depressurization, countercurrent depressurization, purge, and repressurization. The hydrogen recovery was 76.5%. The example notes that the carbon selectively removed water and $CO_2$. Of special interest is the bulk density of the carbon adsorbent determined from the weight of the carbon and its contained volume (1,470 lbs/51.8 $ft^3$) of 0.45 g/cc (28.4 lbs/$ft^3$).

The physical properties of activated carbon used to purify hydrogen are also given in U.S. Pat. No. 4,077,780. This patent teaches a PSA process for separating gas mixtures containing ammonia, argon, methane, nitrogen, and hydrogen to recover both nitrogen and hydrogen. The adsorbent of choice for the recovery of hydrogen has a surface area in the range of 1,050 to 1,150 $m^2/g$, a particle diameter of 0.0075 feet, and a bulk density of 0.51–0.53 g/cc (32–33 lbs/$ft^3$).

U.S. Pat. No. 4,853,004 describes a pressure swing adsorptive separation of gas mixtures, such as air or hydrogen and carbon dioxide, using zeolites and activated carbon using a composite of large and smaller particles of adsorbent. The examples separate air with activated carbon having a density of 0.664 g/ml (41.5 lbs./$ft^3$) and 0.627 g/ml (39.14 lbs./$ft^3$).

Thus, the preferred activated carbon adsorbents taught in the prior art have bulk densities ranging from 0.40 to 0.53 g/cc (25 to 33 lbs/$ft^3$) or 0.62 to 0.66 g/cc (39 to 41.5 lbs./$ft^3$).

The prior art has suggested the use of activated carbons for various separations including the separation of carbon dioxide from hydrogen, but the prior art has not addressed nor solved the problem of reducing gas generator sizing, such as steam-methane reformer size or the size of pressure swing adsorption systems to resolve carbon dioxide containing gas mixtures such as reformate from a steam-methane reformer. The present invention overcomes the problems and inefficiencies of the prior art by using activated carbon adsorbents having unexpected performance capability, unrecognized by the prior art, which provides opportunities for capital cost reductions, and efficiencies in product gas production, such as hydrogen product, which in turn allows gas utilizations in applications where previously such applications were unacceptable due to equipment size or cost constraints, particularly for small scale gas requirements where sizing and costs dictate applicability. These advantages of the present invention will be set forth in greater detail below.

BRIEF SUMMARY OF THE INVENTION

The present invention is a process for adsorbing carbon dioxide from a carbon dioxide containing gas mixture comprising contacting the gas mixture with an activated carbon adsorbent having a density in the range of approximately 35 to 38 lbs./$ft^3$ and adsorbing the carbon dioxide on the activated carbon adsorbent.

Preferably, the carbon dioxide containing gas mixture contains hydrogen.

More preferably, the hydrogen is recovered as an unadsorbed product.

Preferably, the activated carbon adsorbent has a density of approximately 35.5 lbs./$ft^3$.

Alternatively, the carbon dioxide containing gas mixture contains helium.

Preferably, in the alternative embodiment, the helium is recovered as an unadsorbed product.

Preferably, in the alternative embodiment, the activated carbon adsorbent has a density of approximately 38.0 lbs./ft.$^3$.

Preferably, the adsorbent is a bed of adsorbent particles in which the particles have a size in the range of approximately 1 to 3 millimeters in diameter.

Preferably, the carbon dioxide is adsorbed on the activated carbon adsorbent in a pressure swing cycle in several parallel-connected beds of the adsorbent, comprising the steps of:

a) contacting said gas mixture with said activated carbon adsorbent with adsorption of carbon dioxide on the activated carbon adsorbent in a first bed from the gas mixture at elevated pressure;

b) discontinuing adsorption and at least partially pressure equalizing the first bed with another bed of the parallel-connected beds of adsorbent;

c) providing purge gas from the first bed to another bed of the parallel-connected beds of adsorbent;

d) depressurizing the first bed to remove adsorbed carbon dioxide from the adsorbent;

e) purging the first bed with purge gas from another bed of the parallel-connected beds of adsorbent to remove adsorbed carbon dioxide;

f) at least partially pressure equalizing the first bed with another bed of the parallel connected beds of adsorbent;

g) repressurizing the first bed with elevated pressure gas mixture or unadsorbed gas from the gas mixture;

repeating steps a) through g) in each of the parallel-connected beds.

Most preferably, the carbon dioxide containing gas mixture contains hydrogen, carbon dioxide, carbon monoxide, water, nitrogen and methane.

Preferably, the methane is adsorbed with the carbon dioxide on the activated carbon adsorbent.

BRIEF DESCRIPTION OF SEVERAL VIEWS OF THE DRAWINGS

FIG. 3 is a graph of helium feed processed per unit volume of adsorbent bed (standard cubic feet (SCF)/cycle/ft$^3$ of bed) versus carbon bulk density (g/cc) in accordance with Example 2.

DETAILED DESCRIPTION OF THE INVENTION

Figure 1:
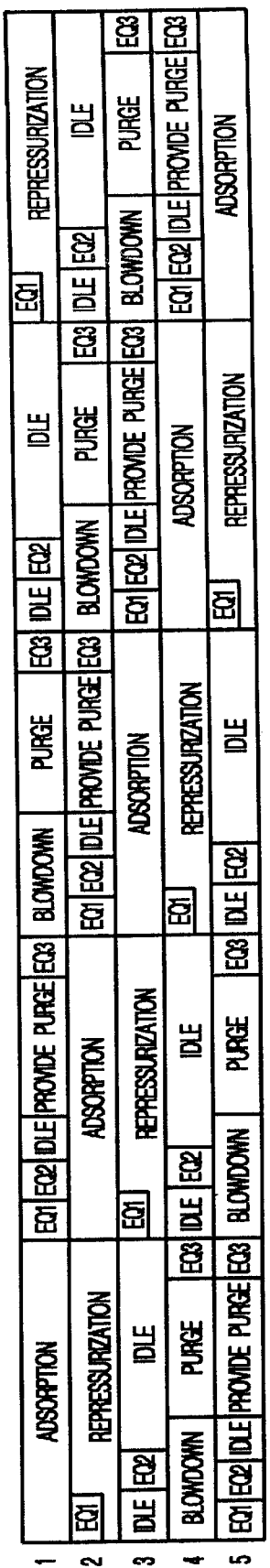
FIG. 1 is a schematic illustration of a preferred five parallel-connected adsorbent bed pressure swing adsorption process sequence.

The present invention is directed to the resolution of the problem of removing carbon dioxide and other carbon oxides from feed gas mixtures enriched in a more economically desirable gases, such as hydrogen or helium, so as to reduce the size of adsorbent beds used to remove carbon dioxide from such gas mixtures. Resolution of this problem allows the reduction in size of gas generators, such as steam-methane reformers, which create hydrogen and carbon dioxide containing feed gas mixtures, as well as increases in productivity (Ibmoles of unadsorbed gas produced/adsorption bed volume) and recovery (unadsorbed gas produced/unadsorbed gas in feed, %).

Hydrogen production via pressure swing adsorption (PSA) is a multi-million dollar industry supplying high purity hydrogen for chemical producing industries, metals refining and other related industries. A typical commercial source for the production of hydrogen is by reforming of natural gas or other methane-rich hydrocarbon streams. The reforming is carried out by reacting the hydrocarbon with steam and/or with oxygen-containing gas (e.g., air or oxygen-enriched air), producing a hydrogen gas stream containing accompanying amounts of oxides of carbon, water, residual methane and nitrogen. Unless it is desired to recover carbon monoxide, it is customarily converted to carbon dioxide by water gas shift reaction to maximize the hydrogen content in the stream. Typically, this gas stream is then sent to a PSA unit. The PSA vessels generally contain a mixture of activated carbon, for bulk CO$_2$ and CH$_4$ removal, followed by molecular sieve for CO and N$_2$ removal. Other hydrogen-rich gas sources which can be upgraded by PSA technology to a high purity product include refinery off-gases with C$_1$–C$_6$ hydrocarbon contaminants and effluent streams from partial oxidation units.

The cost of hydrogen from integrated reformer/PSA systems is impacted by both the capital and operating costs of the system. Clearly, economic production of hydrogen requires as low as possible operating and capital costs. Capital cost is most widely effected by the size of the reformer and the size of the PSA beds. PSA bed size decreases as the hydrogen productivity (Ibmoles of hydrogen produced/bed volume) of the PSA increases. Hydrogen productivity can be increased by either improved process cycles or improved adsorbents. The size of the reformer is impacted mostly by the hydrogen recovery of the PSA. Improvements in hydrogen recovery in the PSA results in smaller reformer size (need to produce less hydrogen out of the reformer because of better recovery in the PSA). Improvements in hydrogen recovery also results in a reduced demand for reformer feed gas, i.e., natural gas, which constitutes the largest operating cost of the reformer. Hydrogen recovery in the PSA can also be improved by either improved process cycles or improved adsorbents.

The current invention defines the unexpected high performing bulk density (poured density) of activated carbon used for H$_2$ PSA applications. Various experiments have been carried out to test the effect of carbon bulk density on PSA performance. These experiments show that as bulk density increases, the PSA performance increases. An unexpected preferred range in density resulting in superior performance has been discovered as set forth below. Decreasing the density or increasing the density further outside this range as performed by the prior art decreases PSA performance.

EXAMPLE 1

Figure 2:
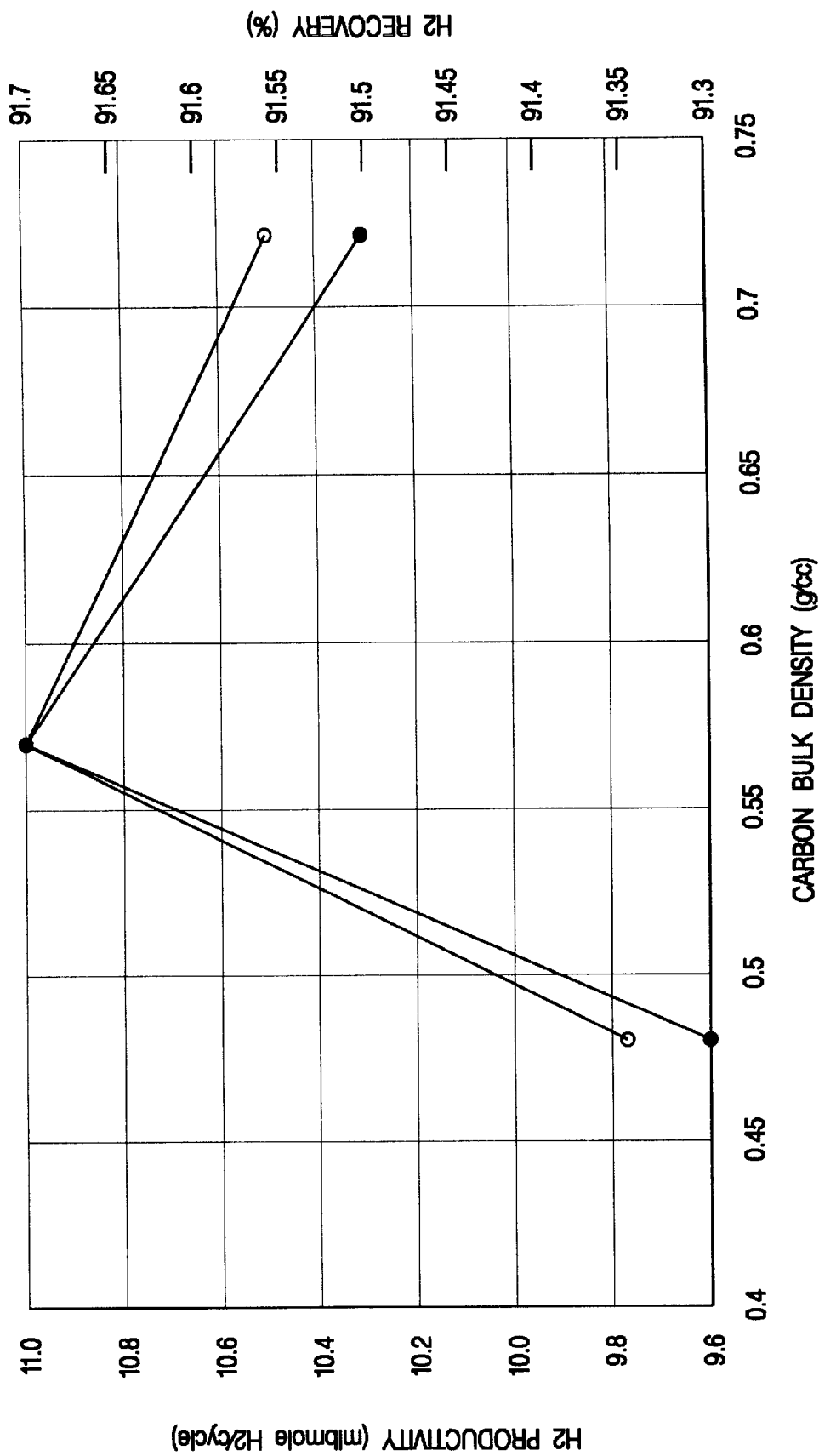
FIG. 2 is a graph of hydrogen productivity (mlbmole H$_2$/cycle) "●" and hydrogen recovery (wt. %) "○" versus carbon bulk density (g/cc) in accordance with Example 1.

The effect of activated carbon bulk density on H$_2$ PSA performance was measured in a pilot unit which consisted of 5 beds each 1 inch in diameter by 20 feet in length. The process cycle steps for the 5-bed PSA with 3 equilizations are shown in FIG. 1. The cycle time (bed on-stream) was 6 minutes. Using a feed gas of 72% H$_2$, 19.1% CO$_2$, 0.3% CO, 7.2% CH$_4$, and 1.3% N$_2$, a feed pressure of 365 psig, a feed temperature of 22° C., a 60% carbon and 40% 5A zeolite adsorbent split and producing an H$_2$ product with 500 ppm N$_2$, the effect of carbon bulk density on H$_2$ recovery "○" and productivity "●" is given in FIG. 2. The average particle diameter of both adsorbents was approximately 2 mm. The results show that an unexpected high performance in both recovery and productivity occurs at a carbon bulk density of 0.57 g/cc (35.6 lbs/ft$^3$). Bulk densities both less and greater than 0.57 g/cc (35.6 lbs/ft$^3$) result in both lower recovery and productivity.

EXAMPLE 2

The effect of carbon bulk density on dilute $CO_2$ removal from helium was also measured in a single column PSA. The units consisted of a 1-inch diameter column by 6 feet in length. With a feed gas of 5% $CO_2$ in He, a feed pressure of 350 psig, and a feed temperature of 22° C., the feed gas processed per unit volume of bed was determined. The PSA cycle consisted of high pressure feed (350 psig), co-current blowdown to 10 psig, countercurrent helium purge at 10 psig, and helium repressurization to 350 psig. The stream flows and duration were set up so that the process purge to feed (P/F) ratio on an actual cubic feet (ACF) basis was 1.5. The results of this testing is given in FIG. 3. The results again clearly show that the bed productivity reaches an unexpected preferred range of performance at an active carbon bulk density of 0.61 g/cc (38.0 lbs/ft$^3$).

The active carbon for use in $H_2$ or He PSA should have a bulk density of 0.56 g/cc (35 lbs/ft$^3$) to 0.61 g/cc (38 lbs/ft$^3$). The carbon can be derived from nut shells, coal, wood, and polymer precursors. The particle diameter should be less than 3 mm in diameter, but not smaller than 1 mm in diameter.

Traditionally, active carbons for gas phase application have bulk densities which range from 0.40 g/cc to 0.51 g/cc (25 to 32 lbs/ft$^3$). The cited prior art teaches the use of active carbon for water, bulk $CO_2$ and $CH_4$ removal from $H_2$. The prior art also teaches the use of active carbon with bulk densities ranging from 0.40 g/cc to 0.53 g/cc (25 to 33 lbs/ft$^3$). The results of our experimental testing shows that increasing the active carbon bulk density to 0.56 g/cc to 0.61 g/cc (35 and 38 lbs/ft$^3$) increases both the productivity and recovery of the $H_2$ PSA process. Increasing the carbon bulk density to 0.72 g/cc (45 lbs/ft$^3$) decreases the PSA performance. As the bulk density of the carbon increases, the void fraction of the adsorbent column decreases, which will minimize the $H_2$ loss during the blowdown step yielding improved $H_2$ recovery. However, as the bulk density increases beyond these values, the micropore volume and adsorption capacity decreases reducing PSA performance. It is unobvious where the high performance in carbon density should be, given these competing effects.

The value of this invention is clear. Firstly, these high performance density carbons yield improved PSA performance, i.e., better $H_2$ productivity and recovery. Improved productivity results in smaller bed sizes and lower capital costs. Improved recovery reduces the size of the reformer and the use of natural gas. This reduces both capital and operating costs.

The prior art has suggested the use of activated carbons for various separations, including the separation of carbon dioxide from hydrogen, but the prior art has not addressed nor solved the problem of reducing gas generator sizing, such as steam-methane reformer size or the size of pressure swing adsorption systems to resolve carbon dioxide containing gas mixtures, such as reformate from a steam-methane reformer. The present invention overcomes the problems and inefficiencies of the prior art by using activated carbon adsorbents having unexpected performance capability, unrecognized by the prior art, which provides opportunities for capital cost reductions, and efficiencies in product gas production, such as hydrogen product, which in turn allows gas utilizations in applications where previously such applications were unacceptable due to equipment size or cost constraints, particularly for small scale gas requirements where sizing and costs dictate applicability.

The present invention has been described with regard to several preferred embodiments, however the full scope of the present invention should be ascertained from the claims which follow.

We claim:

1. A process for adsorbing carbon dioxide and methane from a carbon dioxide and methane containing gas mixture, which also contains a product gas selected from the group consisting of hydrogen, helium and mixtures thereof, comprising contacting said gas mixture with an activated carbon adsorbent having a density in the range of approximately 35 to 38 lbs./ft$^3$ and adsorbing said carbon dioxide and methane on said activated carbon adsorbent, while said product gas is recovered as an unadsorbed product.

2. The process of claim 1 wherein said product gas is hydrogen and said density is approximately 35.5 lbs./ft.$^3$.

3. The process of claim 1 wherein said product gas is helium and said density is approximately 38.0 lbs./ft.$^3$.

4. The process of claim 1 wherein said adsorbent is a bed of adsorbent particles in which the particles have a size in the range of approximately 1 to 3 millimeters in diameter.

5. The process of claim 1 wherein said carbon dioxide and methane are adsorbed on said activated carbon adsorbent in a pressure swing cycle in several parallel-connected beds of said adsorbent, comprising the steps of:

a) contacting said gas mixture with said activated carbon adsorbent with adsorption of carbon dioxide and methane on said activated carbon adsorbent in a first bed from said gas mixture at elevated pressure;

b) discontinuing adsorption and at least partially pressure equalizing said first bed with another bed of said parallel-connected beds of adsorbent;

c) providing purge gas from said first bed to another bed of said parallel-connected beds of adsorbent;

d) depressurizing said first bed to remove adsorbed carbon dioxide and methane from said adsorbent;

e) purging said first bed with purge gas from another bed of said parallel-connected beds of adsorbent to remove adsorbed carbon dioxide and methane;

f) at least partially pressure equalizing said first bed with another bed of said parallel connected beds of adsorbent;

g) repressurizing said first bed with elevated pressure gas mixture or unadsorbed gas from said gas mixture;

h) repeating steps a) through g) in each of said parallel-connected beds.

6. The process of claim 1 wherein said carbon dioxide containing gas mixture further contains carbon monoxide, water, and nitrogen.

* * * * *